US008259120B2

(12) United States Patent
Liu et al.

(10) Patent No.: US 8,259,120 B2
(45) Date of Patent: Sep. 4, 2012

(54) SEAMLESS SWITCHING BETWEEN GRAPHICS CONTROLLERS

(75) Inventors: Chin-Jui Liu, Xizhi (TW); Wei-Kuang Chu, Taipei (TW)

(73) Assignee: Dell Products L.P., Round Rock, TX (US)

(*) Notice: Subject to any disclaimer, the term of this patent is extended or adjusted under 35 U.S.C. 154(b) by 240 days.

(21) Appl. No.: 12/792,074

(22) Filed: Jun. 2, 2010

(65) Prior Publication Data

US 2011/0298812 A1 Dec. 8, 2011

(51) Int. Cl.
*G06F 15/16* (2006.01)
*G09G 5/36* (2006.01)

(52) U.S. Cl. ........................................ 345/502; 345/545

(58) Field of Classification Search .................. 345/502, 345/545, 501, 530
See application file for complete search history.

(56) References Cited

U.S. PATENT DOCUMENTS 4,704,697 A 11/1987 Kiremidjian et al.
6,384,831 B1 5/2002 Nakamura et al.
6,567,099 B1 5/2003 Dawson
6,839,094 B2 1/2005 Tang et al.
2008/0238951 A1* 10/2008 Kai .............................. 345/690
2010/0164962 A1* 7/2010 Sakariya et al. .............. 345/502
2010/0164963 A1* 7/2010 Sakariya ....................... 345/502
2010/0315427 A1* 12/2010 Wyatt et al. ................... 345/502

OTHER PUBLICATIONS

A. Lee et al., 6.2: Integrated TFT-LCD Timing Controllers with RSDS Column Driver Interface, Interface Products, National Semiconductor Corporation, SID 00 Digest, http://www.national.com/appinfo/fpd/files/RSDS_SID.pdf, May 2000.

INTEL, Intel Centrino 2 with vPro Technology, Increase Security and Productivity while Lowering TCO and energy consumption, 2009.

* cited by examiner

*Primary Examiner* — Jacinta M Crawford
(74) *Attorney, Agent, or Firm* — Hamilton & Terrile, LLP; Stephen A. Terrile

(57) ABSTRACT

A system and method for resolving the blank screen issue when switching between graphics processing units. The system and method provide a graphics adapter LCD timing controller (Tcon) with a frame buffer specifically dedicated to storing previously presented screen data for use when switching graphic processing units. The system further includes a protocol comparator unit within a serial-to-parallel converter and a memory controller coupled to the protocol comparator.

9 Claims, 5 Drawing Sheets

SEAMLESS SWITCHING BETWEEN GRAPHICS CONTROLLERS

BACKGROUND OF THE INVENTION

1. Field of the Invention

The present invention relates to information handling systems and more particularly to seamless switching between graphics controllers.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a graphics controller. For example, FIG. 1, labeled Prior Art, shows an example of a liquid crystal display (LCD) timing controller (Tcon) module.

Certain graphics controller platforms, such as the graphic controller on the Centrino 2 platform available from Intel, Inc., allow dynamic switching of graphics controllers between a discrete graphics processing unit (dGPU) and an integrated graphics processing unit (iGPU). These types of graphics platforms allow dynamic switching graphic controller between the dGPU and the iGPU to provide performance enhancements (e.g., when controlling graphics via the dGPU) or power saving (e.g., when controlling graphics via the iGPU and powering down the dGPU). The control mechanism for the switching may be triggered by a power source (such as an alternating current/direct current (AC/DC) source), or by activating a hot key or button on the information handling system.

One issue for graphics platforms which incorporate the ability to switch between the dGPU and the iGPU is that with certain of these platforms a blank (e.g., black) screen occurs (often for several seconds) on a display coupled to the controller when the graphic controllers are switching to from one type to another type.

Accordingly, it would be desirable to provide a system for resolving the blank screen issue when switching between graphics controllers.

SUMMARY OF THE INVENTION

In accordance with the present invention, a system and method for resolving the blank screen issue when switching between graphics processing units is set forth.

More specifically, the system provides a graphics adapter LCD timing controller (Tcon) with a frame buffer specifically dedicated to storing previously presented screen data for use when switching graphic processing units. The system further includes a protocol comparator unit within a serial-to-parallel converter and a memory controller coupled to the protocol comparator.

In one embodiment, the invention relates to a method for switching between graphics processing units comprising: providing a graphics adapter timing controller (Tcon) with a frame buffer, storing previously presented screen data within the frame buffer; and, providing the previously presented screen data to a display device upon switching control between a first graphics adapter and a second graphics adapter.

In another embodiment, the invention relates to an apparatus for switching between graphics processing units comprising: means for providing a graphics adapter timing controller (Tcon) with a frame buffer; means for storing previously presented screen data within the frame buffer; and, means for providing the previously presented screen data to a display device upon switching control between a first graphics adapter and a second graphics adapter.

In another embodiment, the invention relates to an information handling system comprising: a processor; memory coupled to the processor; and, a graphics adapter timing controller (Tcon) coupled to the processor, the graphics adapter Tcon comprising a frame buffer, the frame buffer storing previously presented screen data, the graphics adapter Tcon providing the previously presented screen data to a display device upon switching control between a first graphics adapter and a second graphics adapter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element FIG. 1, labeled Prior Art, shows a block diagram of a known timing controller (Tcon) module

DETAILED DESCRIPTION

Figure 1:
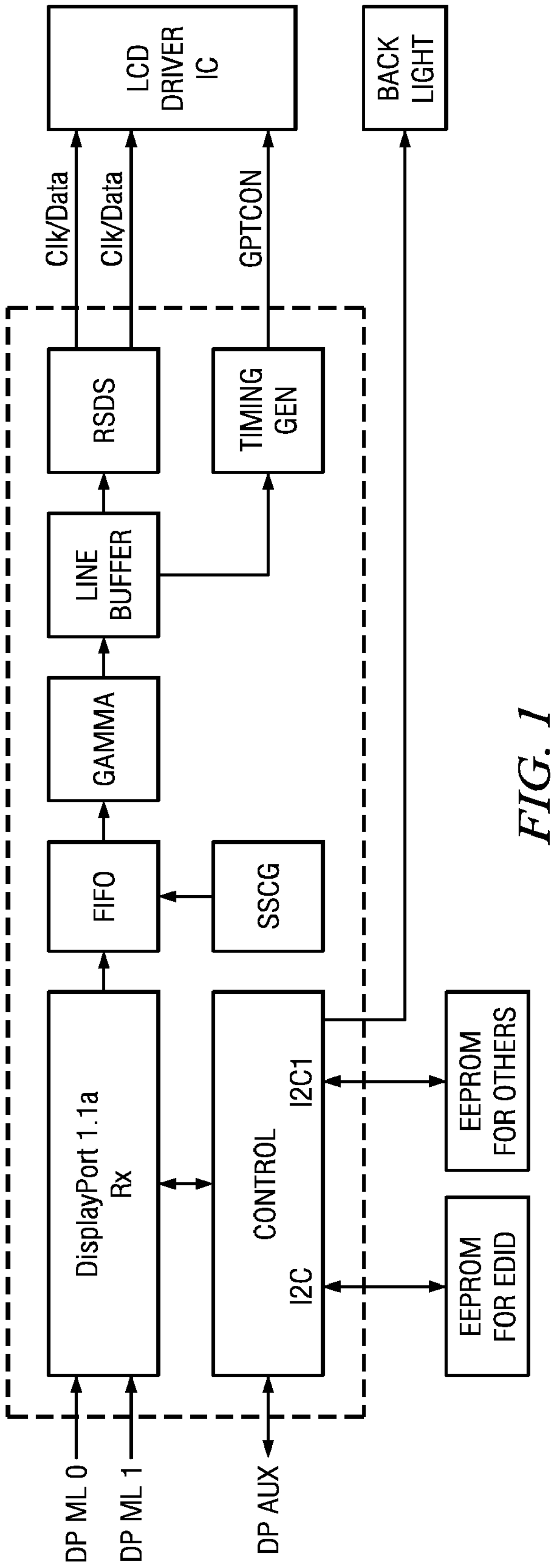
FIG. 1 (PRIOR ART)
Figure 2:
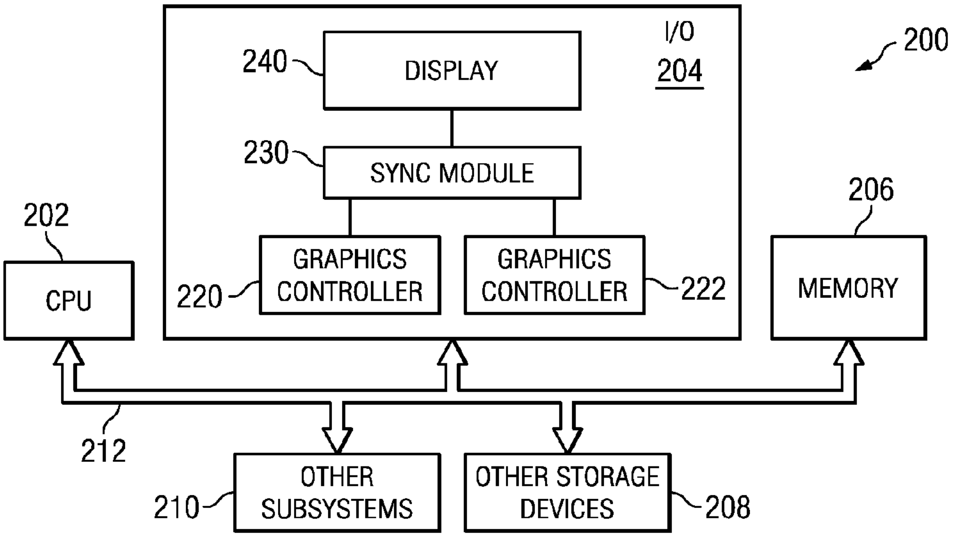
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers (each of which may be coupled remotely to the information handling system 200), a memory 206 including volatile memory such as random access memory (RAM) and non-volatile memory such as a hard disk and drive, and other storage devices 208, such as an optical disk and drive and other memory devices, and various other subsystems 210, all interconnected via one or more buses 212.

In the information handling system 200, the I/O devices 204 include a first graphics controller 220 and a second graphics controller 222. The information handling system 200 further includes a synchronization module 230 for enabling transition of control between the first and second graphics controllers 220, 222. The information handling system 200 further includes a basic input output system 230 and an operating system 232 stored on the memory and including instructions executable by the processor 202.

In reviewing graphics platforms having the switchable architecture, it has been determined that a screenshot is composed of complete data packets from a graphics device via a low voltage differential signal/embedded DisplayPort (LVDS/eDP) interface. Without the synchronization module 230, it would be difficult to make the different graphics devices simultaneously drive LVDS/eDP packets to the LCD timing controller LCD Tcon. When the LCD Tcon packet source is switched from the first graphic device 220 (e.g., an integrated graphics device) to the second graphics device 222 (e.g., a discrete graphics device), the first graphics device 220 may not complete a transmission of data packets before the transition is completed, thus potentially resulting in the blank screen due to the data stream being interrupted. The same issue can be observed when transitioning from the second graphics device 222 to the first graphics device 220. If the LCD Tcon cannot obtain complete data packets during the graphics device transition then the blank screen issue occurs until the LCD Tcon obtains the complete data packets again from the graphics device to which control is transitioned.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
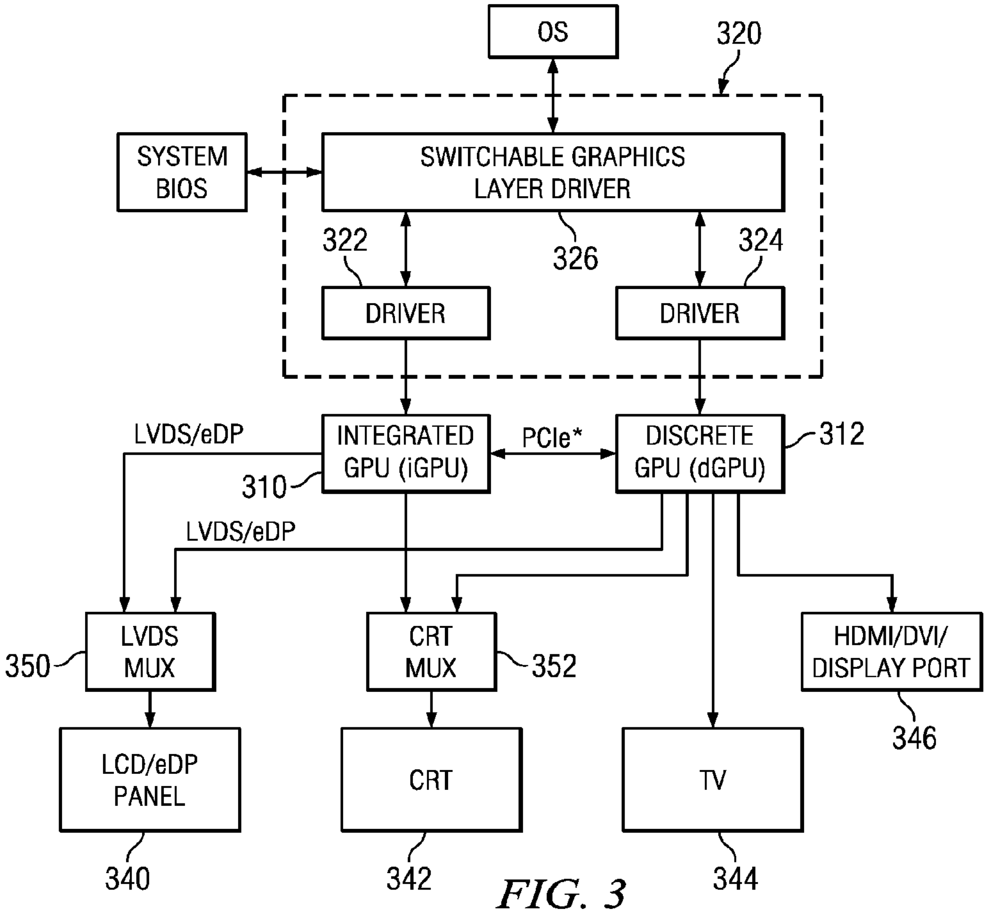
FIG. 3 shows a block diagram of a graphics architecture of an information handling system.

FIG. 3 shows a block diagram of a graphics architecture of an information handling system. More specifically, the graphics architecture 300 includes an integrated graphics controller 310 and a discrete graphics controller 312. The graphics architecture 300 includes a driver module 320, which is coupled to the BIOS 230 and the operating system 232 of the information handling system. The driver module 320 includes an integrated graphics controller driver 322 and a discrete graphics controller driver 324, which correspond to integrated graphics controller 310 and discrete graphics controller 312, respectively. The driver module 320 further includes a switchable graphics layer driver 326.

The graphics controllers 310, 312 may be coupled to any of a plurality of display devices including a Liquid Crystal display/embedded DisplayPort (LCD/eDP) panel type display device 340, a cathode ray tube (CRT) type display device 342, a television (TV) type display device 344 and/or a digital video type display device 346 (e.g, a High Definition Multimedia Interface (HDMI), Digital Video Interactive (DVI), or display port).

An LVDS synchronization and multiplexer module 350 is coupled between the graphics controllers 310, 312 and the LCD/eDP panel 340. A CRT synchronization and multiplexer module 352 is coupled between the graphics controllers 310, 312 and the LCD/eDP panel 340.

Figure 4:
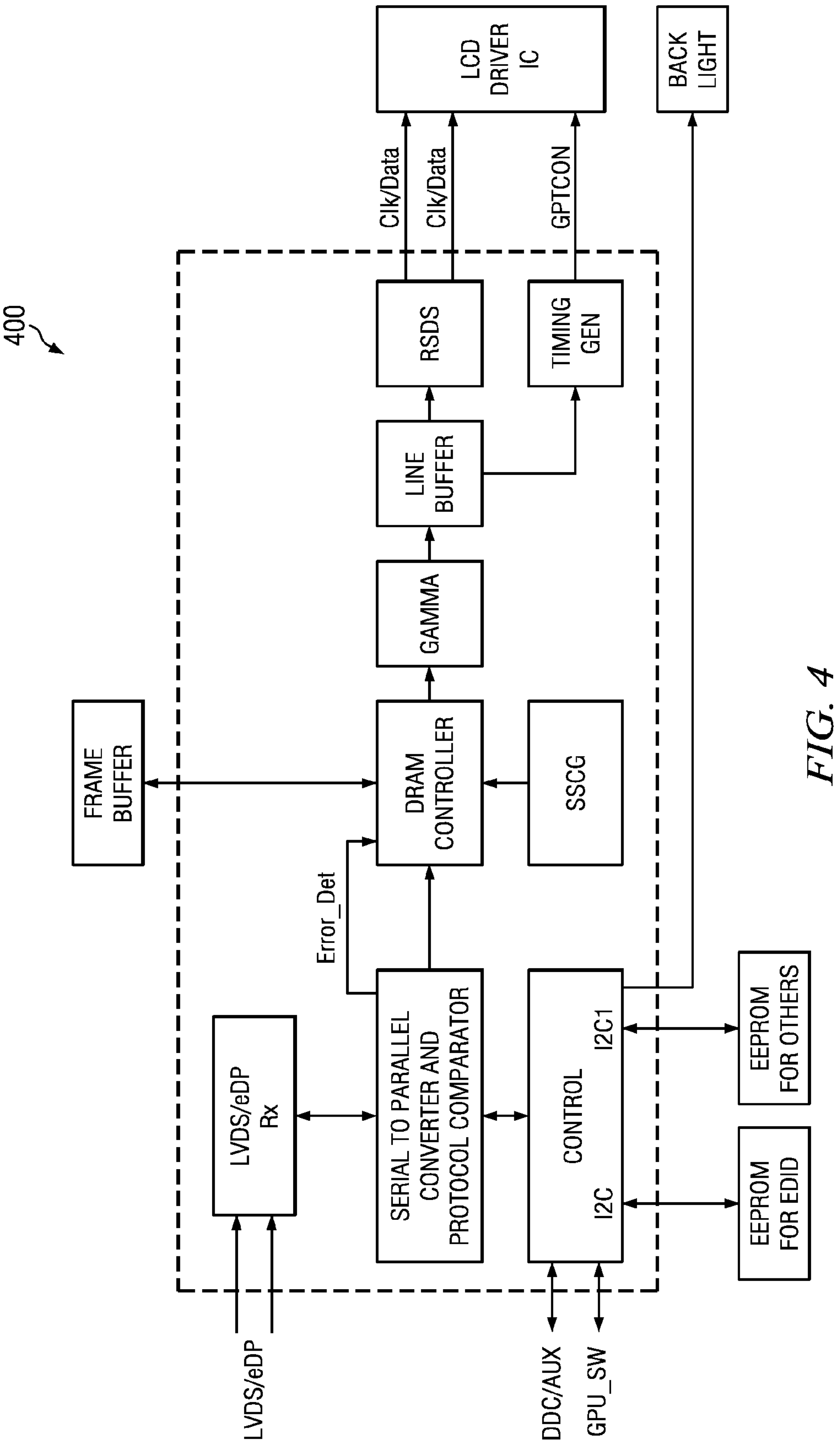
FIG. 4 shows a block diagram of a Tcon module in accordance with the present invention.

Referring to FIG. 4, a block diagram of a LCD timing controller (Tcon) module 400 is shown. The Tcon module 400 includes a serial to parallel converter and protocol comparator 410, a memory controller 412 and a frame buffer 414, which collectively make up one embodiment of a synchronization module for enabling transition of control between the first and second graphics controllers.

The Tcon module 400 further includes a low voltage differential signal/embedded DisplayPort (LVDS/eDP) circuit 420, a control circuit 422, and a spread spectrum clock generation (SSCG) circuit 424 as well as a Gamma module 430, a line buffer module 434, a reduced swing differential signaling (RSDS) circuit 436 and a timing generation circuit 438. The Tcon module 400 further includes an electrically erasable programmable read only memory (EEPROM) 420 for storing extended display identification data (EDID). The Tcon module 400 further includes another EEPROM 442 for storing other display data.

The SSCG circuit 424 provides electro magnetic interference (EMI) reduction via programming options allowing system designers to optimize various EMI generating parameters. The Gamma module 430 provides a gamma compression function referred to as gamma encoding which is used to encode linear luminance or red/green/blue (RGB) values into video signals of digital video file values. The line buffer module 434 provides a linear address space for storing display data within the Tcon module 400. The RSDS circuit 436 and the timing generation circuit 438 provide timing outputs for driving an LCD type display device.

During normal operation, the converter receives (LVDS/eDP) data packets from the active GPU and transfers serial data to parallel data. The parallel data is stored in the frame buffer and is also transferred to the processing unit to drive the thin film transistor liquid crystal display (TFT LCD). A GPU transfer control signal (GPU_SW) is provided to the controller of the Tcon. This GPU transfer control signal is coupled to from an information handling system motherboard to EDID_SW. The extended display identification data select signal (EDID_SELECT) is activated prior to the graphics device select signal (GPU_SELECT) during a GPU transition procedure. The EDID_SELECT signal provides an indication to the Tcon module that the video source will soon be provided by a different graphics device. The protocol comparator then monitors the received data packets. The protocol comparator reports receipt of an error detected signal (ERROR_DET) to the memory controller when the data packets are disrupted (i.e., broken) during the graphics device transition. When the ERROR_DET signal is asserted, the memory controller fetches previous screen data from the frame buffer and provides this screen data to the processing unit to drive the TFT LCD device. Thus the LCD device will keep presenting the previous screen (i.e., the screen data stored within the frame buffer) until the serial-parallel converter receives complete data packets from new graphics device and the protocol comparator de-asserts the ERROR_DET signal.

When the ERROR_DET signal is deasserted, the Tcon module returns to normal operation. Because the Tcon module keep presenting the previous display screen during the graphics device transition, the black screen is effectively eliminated.

Figure 5:
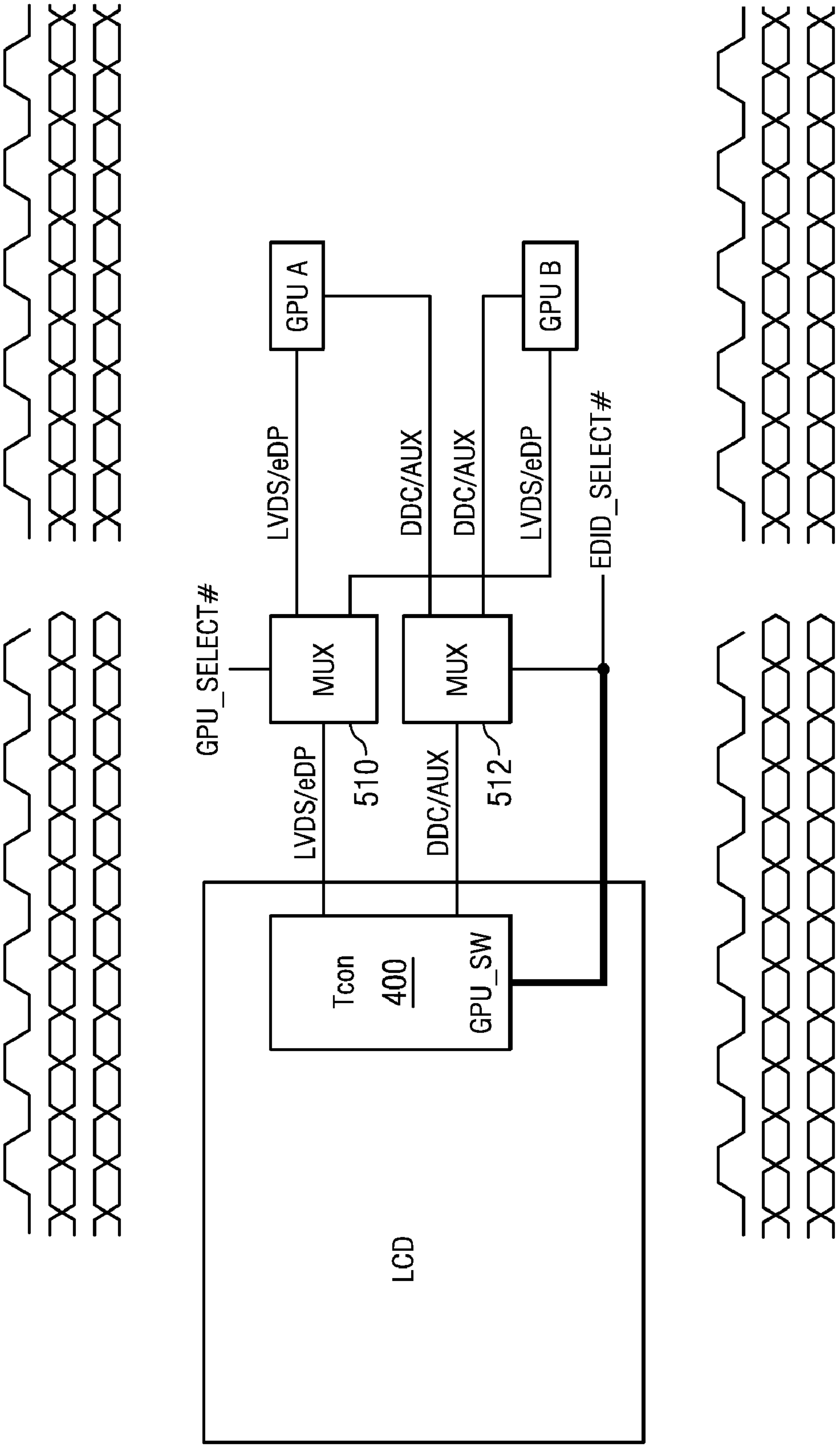
FIG. 5 shows a combined block diagram signal diagram of the operation of a Tcon module in accordance with the present invention.

FIG. 5 shows a combined block diagram signal diagram of the operation of a Tcon module in accordance with the present invention. More specifically, the Tcon module (e.g., Tcon module 400) uses a graphics controller switch signal (GPU_SW) to determine when to switch between graphics controllers. The Tcon module 400 generates a LVDS/eDP signal and display data channel/auxiliary (DDC/AUX) signals which are provided to multiplexers 510, 512, respectively. The DDC/AUX signals are used to read LCD EDID data by the graphics controller. The EDID data defines LCD specific parameters (e.g., size, timing, resolution, etc.). The graphics controller drives the output through the LVDS/eDP signal based upon these LCD parameters.

Based upon the state of the graphics controller switch signal, the Tcon module 400 generates an extended display identification data select signal (EDID_SELECT) signal (in certain embodiments, the EDID_SELECT signal is active low). The EDID_SELECT signal is generated by an embedded controller coupled to the system BIOS. This signal is defined to switch the multiplexers of the LVDS/eDP and DDC/AUS signals from one graphics adapter to the other. This EDID_SELECT signal is also provided to the Tcon module 400 to indicate when an adapter transition occurs and that EDID data can be fetched again. The extended display identification data select signal is provided to multiplexers 510, 512, which in turn provide the LVDS/eDP signal and the DDC/AUX signal to the graphics adapters.

Figure 6:
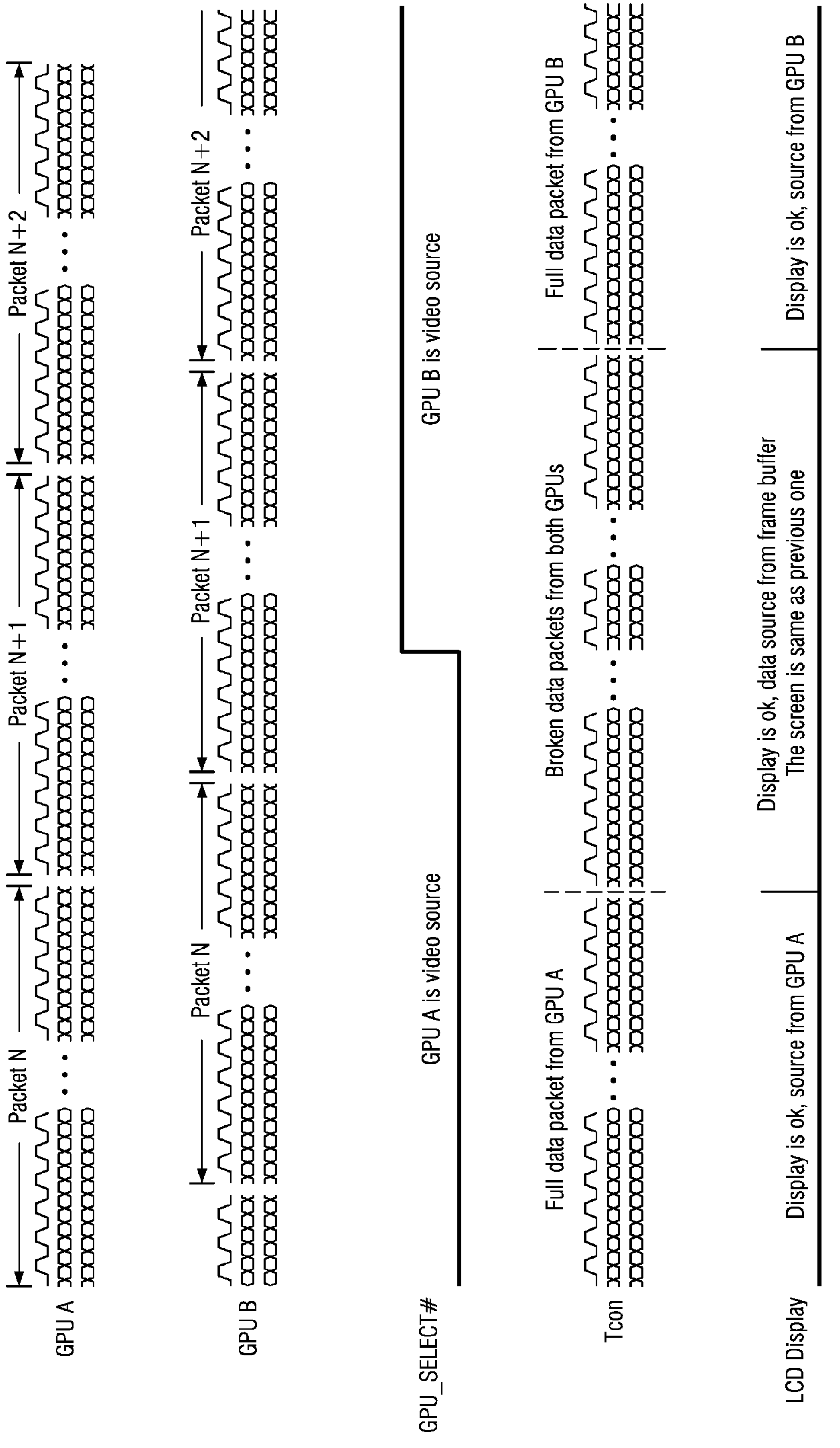
FIG. 6 shows a signal diagram of during transition from a first graphics device to a second graphics device.

FIG. 6 shows a signal diagram of during transition from a first graphics device to a second graphics device. More specifically, under control of the GPU_SELECT signal, the Tcon module 400 allows the LCD display to display data from the frame buffer during the process of switching graphics control between the first and second graphics controllers.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for switching between graphics processing units comprising:

providing a graphics adapter timing controller (Tcon) with a frame buffer;

storing previously presented screen data within the frame buffer; and, providing the previously presented screen data to a display device upon switching control between a first graphics adapter and a second graphics adapter and wherein the Tcon module further comprises a protocol comparator unit within a serial-to-parallel converter and a memory controller coupled to the protocol comparator, the protocol comparator providing previously presented screen data to the frame buffer and the memory controller controlling the frame buffer.

2. The method of claim 1 wherein:

the display device comprises a liquid crystal display (LCD) type display device.

3. The method of claim 1 wherein:

the first graphics adapter comprises an integrated graphics adapter and the second graphics adapter comprises a discrete graphics adapter.

4. An apparatus for switching between graphics processing units comprising:

means for providing a graphics adapter timing controller (Tcon) with a frame buffer, means for storing previously presented screen data within the frame buffer; and, means for providing the previously presented screen data to a display device upon switching control between a first graphics adapter and a second graphics adapter; and wherein the Tcon further comprises a protocol comparator unit within a serial-to-parallel converter and a memory controller coupled to the protocol comparator, the protocol comparator providing previously presented screen data to the frame buffer and the memory controller controlling the frame buffer.

5. The apparatus of claim 4 wherein:

the display device comprises a liquid crystal display (LCD) type display device.

6. The apparatus of claim 4 wherein:

the first graphics adapter comprises an integrated graphics adapter and the second graphics adapter comprises a discrete graphics adapter.

7. An information handling system comprising:

a processor;

memory coupled to the processor; and, a graphics adapter timing controller (Tcon) coupled to the processor, the graphics adapter Tcon comprising a frame buffer, the frame buffer storing previously presented screen data, the graphics adapter Tcon providing the previously presented screen data to a display device upon switching control between a first graphics adapter and a second graphics adapter; and wherein the Tcon further comprises a protocol comparator unit within a serial-to-parallel converter and a memory controller coupled to the protocol comparator, the protocol comparator providing previously presented screen data to the frame buffer and the memory controller controlling the frame buffer.

8. The information handling system of claim 7 wherein:

the display device comprises a liquid crystal display (LCD) type display device.

9. The information handling system of claim 7 wherein:

the first graphics adapter comprises an integrated graphics adapter and the second graphics adapter comprises a discrete graphics adapter.

* * * * *